Dec. 2, 1958

L. P. STEPHENSON 2,862,414

OPTICAL METHOD FOR ELIMINATING FALSE
STRATA FROM A SEISMIC PROFILE SHEET

Filed July 27, 1955

INVENTOR
LEE P. STEPHENSON

BY

ATTORNEYS

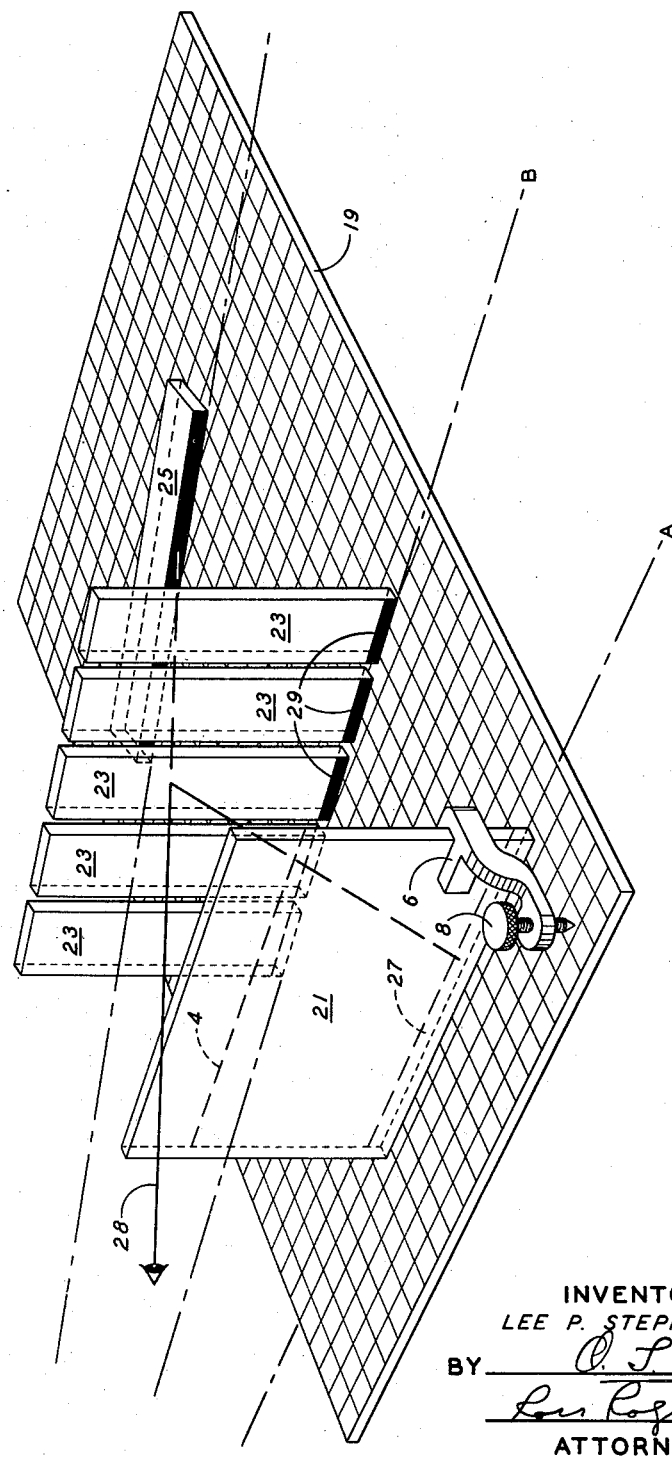

United States Patent Office 2,862,414
Patented Dec. 2, 1958

2,862,414

OPTICAL METHOD FOR ELIMINATING FALSE STRATA FROM A SEISMIC PROFILE SHEET

Lee P. Stephenson, Fullerton, Calif., assignor to California Research Corporation, San Francisco, Calif., a corporation of Delaware Application July 27, 1955, Serial No. 524,796

4 Claims. (Cl. 88—1)

My invention relates to a method of eliminating from seismic cross-sections those events which result from reflections between the surface of the water and the sea bottom, and particularly to an optical analog computer for determining rapidly the expected position of these multiple events, or false strata, upon a seismic cross-section.

The seismic method has been applied to mapping geologic strata below the surface of the ocean. According to this method, a charge of explosive is detonated below the surface of the water, sending seismic energy through the bottom to subsurface discontinuities. From the discontinuities the seismic signal is reflected back to the surface where it is detected by a string of seismic detectors or seismometers. The signals from the seismometers are recorded on seismic records. These records are examined to determine the times of arrival of reflected energy at each of the seismometers. From the arrival time data, seismic cross-sections picturing the deduced subsurface structure are prepared.

Difficulty is often encountered in interpreting the seismic records. In offshore seismic exploration the first reflection from the bottom of the ocean is discerned relatively easily. Later in the record will appear alignments which arise from multiple reflections between the bottom of the ocean and the surface. Multiple reflections of this sort may appear throughout the entire record. Some of the multiple reflections arrive at points in the record at which reflections from geologic beds can be expected to arrive. It is often difficult for a geophysicist to distinguish between multiple reflections and reflections from geologic beds, especially when the ocean bottom has appreciable dip. It is, accordingly, an object of my invention to provide a method for distinguishing between multiple reflections and reflections from geologic beds.

Briefly stated, my invention relates to the method of computing the positions of false strata on a seismic cross-section by the use of an optical analog. According to my method, mirrors are placed on a seismic cross-section along line representing multiple reflecting horizons. False strata are marked onto the seismic cross-section at the position of virtual images of the lower edges of the two mirrors.

The mirrors are placed perpendicular to the cross-section paper by the following method. The first mirror is tilted until virtual images of points on the cross-section paper at one side of the mirror coincide with points which lie the same distance on the cross-section paper at the other side of the mirror. The second mirror is tilted until the virtual images of a line on this mirror lie in a plane as seen in the second mirror. The two mirrors are then perpendicular to the cross-section.

Further objects and advantages of the present invention will become apparent from the following detailed description, taken in conjunction with the accompanying drawing which forms an integral part of the specification.

Fig. 2 shows a perspective drawing of apparatus for carrying out my method.

Figure 1:
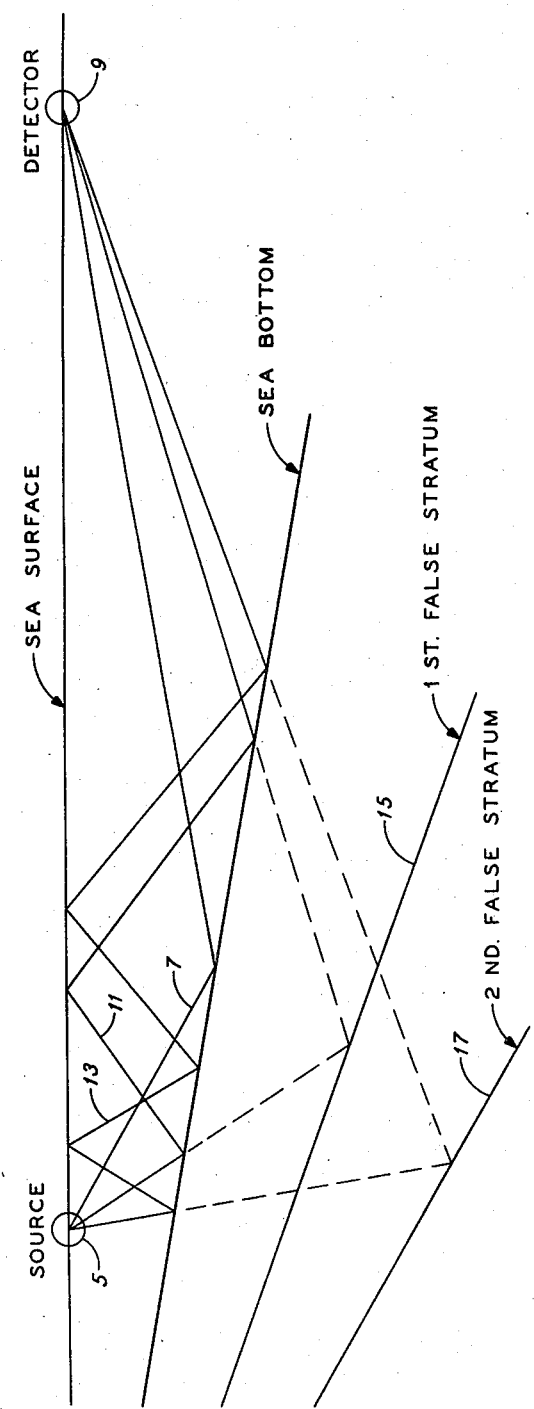
Fig. 1 shows the path of reflected rays and the false strata as they appear from a study of the seismic record.

Fig. 2 of the drawing shows the apparatus setup for the computation of the positions of false strata. In this arrangement the two mirrors must be perpendicular to the plane of the cross-section. The silvered surfaces of the mirrors are facing each other. The first problem is that of setting up the two mirrors perpendicular to the same surface. First, it is necessary that the cross-section paper be placed on as flat a surface as possible in order to minimize errors in the subsequent computation. The mirror 23 is placed on a line in the seismic cross-section which is parallel to the line representing the surface of the water. The line chosen for the mirror 23 is near the middle of the cross-section paper. The operator sights into the mirror 23 and adjusts the inclination of the mirror until the line on the front edge of the cross-section paper is coincident with a line an equal distance back of the silvered surface of the mirror 23. When this coincidence is achieved, the mirror 23 is perpendicular to the cross-section paper. The mirror 23 is then left undisturbed and the mirror 21 is placed so that its silvered surface rests on the line representing the water surface. Its reflecting surface is toward the mirror 23. The mirror 21 has a thin line 4 on its reflecting surface which is parallel to the line 27 at the bottom of the mirror. The operator looks past the mirror 21 into the mirror 23 to see the virtual image of the line 4. He sees a series of virtual images of the line 4 in the mirror 23 resulting from multiple reflections between it and essentially parallel mirror 21. If the mirrors 21 and 23 are not both perpendicular to the same plane, the virtual images of the line 4 will appear to lie in a curved surface. The inclination of the mirror 21 is adjusted by turning the screw 8 in bracket 6 until all of the virtual images of the line 4 appear to lie in the same plane. When these virtual images lie in the same plane, the mirror 21 is parallel to the mirror 23, hence, perpendicular to the cross-section paper.

Leaving the mirror 21 undisturbed, the mirror 23 is placed on a line representing the ocean bottom. Again, looking into the mirror 23, the images of the line 4 on the mirror 21 are observed to see if the mirrors 21 and 23 are parallel. If the virtual images of the line 4 do not appear to lie in the same plane, the mirror 23 is adjusted in inclination to the cross-section paper until the virtual images do lie in the same plane; then the mirror 23 is again perpendicular to the cross-section paper. In the digrammatic drawing the support bracket 6 and screw are not shown on mirror 23, but this mirror has a support which provides adjustable tilting. Both mirrors have now been placed in their proper position on the cross-section paper and they are both perpendicular to the surface of the cross-section paper and the computation of the positions of the false strata can proceed.

In order to explain my method of computing the position of false strata, I must first explain the meaning and origin of false strata. Referring to Fig. 1, an explosive source 5 is located near the surface of the water. The seismic source 5 is detonated, passing energy down into the water. The portion of the energy indicated by the ray 7 strikes the sea bottom and is reflected directly to the detector 9. Another portion of the energy indicated by the ray 11 strikes the sea bottom, then the surface, then the sea bottom and is detected at the surface by detector 9. The ray 13 indicates energy which is reflected twice from the surface and three times from the bottom of the sea. The three rays 7, 11 and 13, arrive at the detector 9 at successive intervals of time, causing alignments between the different traces of the seismic record, such as are normally interpreted as reflections from subterranean horizons.

The ray 7, which is reflected only from the sea bottom, arrives early in the seismic record, and is readily identified as the bottom reflection by those skilled in the art. From a study of the record of the arrival of the ray 7, the geophysicist is able to determine the position of the sea bottom. Greater difficulty is encountered in interpreting the record of the arrival of the ray 11. The time of the arrival of the ray 11 is such that it would appear to have been reflected only by a stratum in the position of the false stratum 15. The ray 13, which is multiply reflected in the water, appears to come from the second false stratum 17. Ordinarily, there is nothing in the seismic record to indicate whether an alignment arises from a multiple reflection in the water, or whether the energy indicated by the alignment is reflected from a subterranean horizon.

One method for distinguishing between useful reflections and multiple water reflections is to calculate the positions of the false strata and to indicate the positions of these strata on the seismic cross-section. Thus, when a reflection appears to arrive from a subterranean stratum in the same position as a predicted false stratum the geophysicist realizes that he has found a false stratum indicated in the record. The procedure of calculating the positions of false strata in order to eliminate them from the seismic cross-section has been found useful, but such calculation has been so complicated and time consuming that it is often omitted to the detriment of the seismic interpretation. In order to greatly decrease the time required to make these calculations, I have devised an analog computer which may be used to compute the theoretical positions of false strata and to indicate the positions of these strata directly on a seismic cross-section which has been plotted assuming a constant seismic velocity equal to the velocity of sound in water.

Apparatus according to my invention is shown in Fig. 2. Seismic cross-section paper is placed on the drawing board 19. In Fig. 2, the mirror 21 is front silvered on the surface away from the eye. The silvered surface of the mirror 21 is placed on the line representing the surface of the sea and perpendicular to the surface of the seismic cross-section paper. A second front-silvered mirror 23 is placed perpendicular to the cross-section paper in a position such that its silvered surface lies toward the eye and along the line representing the bottom of the sea. The mirror 23 has a number of unsilvered vertical stripes. This mirror is represented diagrammatically as a number of coplanar mirrors slightly separated and all placed along the same line. The observer sees a reflection in a portion of this mirror but the unsilvered stripes permit the observer to see through the mirror to objects on the cross-section paper. A straightedge 25 will be used to indicate the positions of false strata on the cross-section paper. Both of the mirrors have black stripes 27 and 29 which have a width equal to the thickness of the straightedge 25.

When the operator desires to indicate false strata on the seismic cross-section, he looks over the mirror 21 into the mirror 23. In the mirror 23 he sees a reflection of the line 27 on mirror 21. The ray 28 shows more graphically the path of light rays to the eye. The eye which receives the ray 28 sees a virtual image which is the reflection of the line 27 in the mirror 23. It appears to the eye that this ray of light came from the seismic cross-section paper behind the mirror 23. This image of the line 27 is termed the virtual image. Since the entire front surface of the mirror 23 is not silvered, the observer sees through a portion of the mirror and in a portion of the mirror he sees a virtual image of the line 27. He places the straightedge 25 in coincidence with the virtual image of the line 27 by looking through the unsilvered portion of the mirror and adjusting the straightedge 25 until it appears to coincide with the virtual image. As shown from another angle in Fig. 3, the eye seeing the ray 28 sees the virtual image in coincidence with the straightedge 25 at the position nearer the mirror 23. He also see the ray 31 which has been reflected by the mirror 21 and the mirror 23 before reaching the eye. In the mirror 23 he sees a virtual image of the stripe 29 at the bottom of the mirror 23. The virtual image for this reflection is shown by the straightedge 26 in Fig. 3 at the position more distant from the mirror 23.

In order not to complicate the drawing further, other multiple reflections between the mirrors 21 and 23 are not shown, but the operator sees also a reflection of the line 27 which has been reflected once from the mirror 21, and twice from the mirror 23. He places the straightedge on the virtual image of this reflection and makes a line on the seismic cross-section. Other multiple reflections are visible to the operator and he can indicate these reflections on the seismic cross-sections to the extent that it appears desirable.

It is unnecessary that the false strata be marked onto the seismic cross-section. The seismic cross-section can be first drawn assuming all alignments which appear in the record to be true geologic horizons. The plotting of the events must be based upon the assumption of a constant seismic velocity equal to the velocity of sound in water (or, more generally, assuming a velocity equal to the velocity of sound in the medium between the reflecting surfaces). Then the method I have described may be used to determine the position of false strata and to remove false strata from the seismic cross-section. Alternatively, as described above, the operator can indicate the false strata, then prepare his seismic cross-section, eliminating apparent geological horizons which coincide with false strata.

Figure 3:
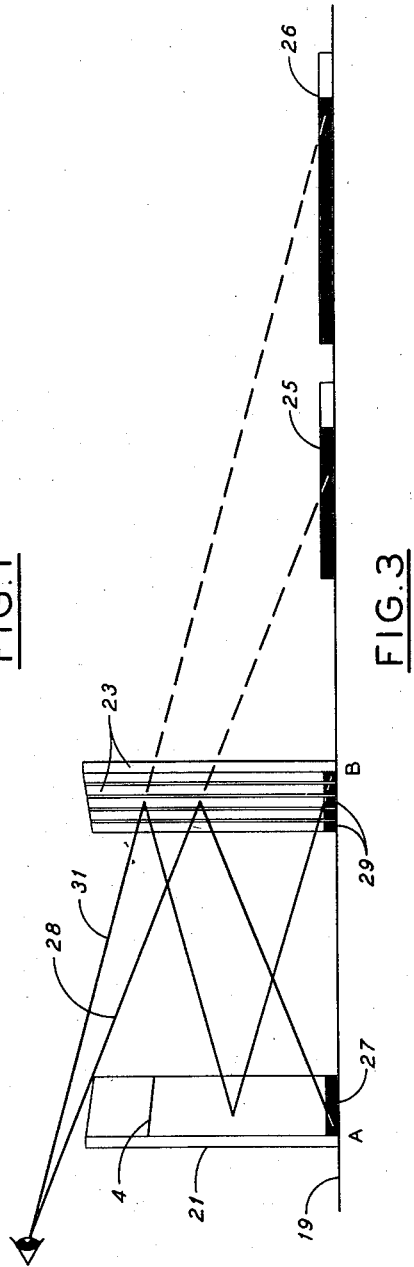
Fig. 3 shows a side view of apparatus for carrying out my method.

The mirror 23 in Figs. 2 and 3 is shown as being made of a number of coplanar mirrors. Such an arrangement is highly desirable but the mirrors may be difficult to align under some circumstances. In that event, a single mirror having a number of unsilvered strips is satisfactory. Through refraction, such a mirror causes some displacement in the apparent position of the straightedge 25 as seen by the operator and, for that reason, introduces error into the calculation. As an alternative, the single mirror may be used with its entire surface silvered. In that event, the operator looks around the edge of both the mirrors 21 and 23 to see his straightedge 25. He then lines the straightedge with the virtual image as seen in the silvered surface of mirror 23.

I have described my invention with reference to a specific embodiment thereof. I am aware, however, that many modifications thereof can be made without departing from my invention. I do not intend, therefore, to limit my invention except as set forth in the appended claims.

I claim:

1. The method of mapping on a substantially plane surface the expected times of arrival of sound waves multiply reflected between two reflecting surfaces comprising the steps of placing a first and a second mirror each perpendicular to the substantially plane surface, positioning said first mirror along a first line, placing said second mirror along a second line, the reflecting surfaces of said mirrors facing each other and the angle between said first and said second line being equal to the angle between said reflecting surfaces, the distance between said mirrors being selected according to a predetermined scale, and plotting a line on said plane surface along the virtual image of the lower edge of said first mirror, the position of said line on said plane surface corresponding to the position of the false stratum from which said multiply reflected waves were apparently reflected as seen in said second mirror.

2. The method of mapping on a seismic cross-section the position of a false stratum due to multiple reflections between two reflecting surfaces comprising the steps of placing cross-section paper on a plane surface, placing a first mirror along a first line on said paper at which the first reflecting surface is represented, placing a second mirror on a second line representing the second reflecting surface, arranging said first and said second mirrors perpendicular to said paper, the reflecting surfaces of said mirrors facing each other, and plotting on said paper the positions of virtual images of said first and said second lines as seen in said second mirror by multiple reflection, whereby lines are drawn on said cross-section paper showing the positions of the false strata due to multiple reflections between the two reflecting surfaces.

3. The method of mapping expected times of arrival of acoustic waves multiply reflected between two reflecting surfaces comprising the steps of preparing a seismic cross-section of the two reflecting surfaces based on a constant velocity equal to the velocity between the two reflecting surfaces, placing a first mirror perpendicular to the cross-section on a line corresponding to the upper reflecting surface, placing a second mirror perpendicular to the cross-section along a line corresponding to the lower reflecting surface, the mirrored surfaces of the first and second mirrors facing each other, and plotting, on the cross-section, lines coincident with the virtual images of the lower edges of the first and second mirrors to indicate the positions on said cross-section of the false strata from which said multiply reflected waves were apparently reflected.

4. The method of preparing a seismic cross-section representative of an offshore area in which acoustic waves are multiply reflected between the ocean surface and the ocean bottom comprising the steps of plotting on cross-section paper the positions of said ocean surface and said ocean bottom if acoustic waves moved at a constant velocity, the constant velocity being that between two multiple reflecting surfaces, placing a pair of plane mirrors on the lines on the cross-section which represent the ocean surface and the ocean bottom and perpendicular to the seismic cross-section, the reflecting faces of the mirrors being orientated toward each other, and indicating on the cross-section all reflecting surfaces which coincide with virtual images of the lower edges of the mirrors as seen in one of the mirrors, said indicated reflecting surfaces corresponding to false strata from which said multiply reflected waves were apparently reflected.

References Cited in the file of this patent

UNITED STATES PATENTS

| | | |
|---|---|---|
| 489,953 | Hill | Jan. 17, 1893 |
| 527,640 | Wetherill | Oct. 16, 1894 |
| 1,971,119 | O'Neil | Aug. 21, 1934 |
| 2,192,972 | Innes | Mar. 12, 1940 |
| 2,345,288 | Pugh | Mar. 28, 1944 |
| 2,348,411 | Petty | May 9, 1944 |
| 2,461,166 | Luboshez | Feb. 8, 1949 |
| 2,476,426 | McLeod | July 19, 1949 |

FOREIGN PATENTS

| | | |
|---|---|---|
| 518,352 | Germany | Feb. 14, 1931 |